(12) United States Patent
Aggarwal et al.

(10) Patent No.: US 9,356,927 B2
(45) Date of Patent: May 31, 2016

(54) ENABLING DIGITAL SIGNATURES IN MOBILE APPS

(71) Applicant: Adobe Systems Incorporated, San Jose, CA (US)

(72) Inventors: Neerav Aggarwal, Ghaziabad (IN); Salil Taneja, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/471,590

(22) Filed: Aug. 28, 2014

(65) Prior Publication Data

US 2016/0065567 A1 Mar. 3, 2016

(51) Int. Cl.
*H04L 29/06* (2006.01)
*H04L 9/32* (2006.01)

(52) U.S. Cl.
CPC .......... *H04L 63/0823* (2013.01); *H04L 9/3247* (2013.01)

(58) Field of Classification Search
CPC ... H04L 9/3247; H04L 63/0823; H04L 63/04; H04L 2209/60
See application file for complete search history.

(56) References Cited

FOREIGN PATENT DOCUMENTS

WO　WO 2014174491 A1 * 10/2014 ............ H04W 12/04

* cited by examiner

*Primary Examiner* — Izunna Okeke
(74) *Attorney, Agent, or Firm* — Keller Jolley Preece

(57) ABSTRACT

A computer implemented method and apparatus for provisioning certificates for use in applying digital signatures to electronic content are described. A method for provisioning a certificate to a user for use in applying a digital signature to electronically stored content includes receiving a request for the certificate. Each certificate is unique to a particular user and is usable, by an application executable by a processor of a computer device, to apply a digital signature to electronically stored content. The method further includes embedding the certificate in a wrapper formatted according to a file format compatible with the application. The wrapper includes at least one attribute facilitating enforcement of one or more digital rights management rule(s), and the method further includes sending the wrapped certificate containing the embedded certificate to the computer device.

20 Claims, 6 Drawing Sheets

ENABLING DIGITAL SIGNATURES IN MOBILE APPS

BACKGROUND OF THE INVENTION

1. Field of the Invention

Embodiments generally relate to digital rights management and, more particularly, to methods and apparatus for provisioning a private key to a user, for use by an application executable at a computer device, to apply a digital signature to content authored using the application.

2. Description of the Related Art

Digital content such as documents, spreadsheets, drawings, digital photos, audio recordings, and movies are frequently created and/or modified using a computer device such as a desktop computer, laptop or notebook computer, or a mobile terminal like a smart phone or tablet computer. Authors of such electronically stored content presently have two options when it comes to distribution. The author can, for example, produce and sign tangible copies of the content. It is far more common today, however, for the content creator to transmit or otherwise distribute the works in an electronic format. The electronic format selected for distribution can be one of several formats supported by and/or specific to the particular application employed by the user. To accommodate a broader audience, the original format may be converted into a more ubiquitous format compatible with a more widely installed application.

In order to control access to and/or enforce proprietary rights in content authored and distributed electronically, a digital "signature" is applied by an application executing on the computer device. For some computer devices, such as many conventional desktop, laptop and/or notebook computers, an application applying a digital signature retrieves a user certificate, also known as a private key, from a smart card or local certificate store residing in the memory of the computer device. Other computer devices, such as mobile terminals like smart phones, tablet computers, wearable computers, and personal digital assistants, however, may not be configured or configurable to securely access an external hardware device like a smart card. In such cases, each application seeking to apply a digital signature to content on behalf of a user must have access to its own respective private key for that unique user in the certificate store. Moreover, a typical mobile application configurable to apply digital signatures is unable to retrieve information it did not process and store as part of an installation or other specialized process. This means that each mobile application must store, for each supported user, a certificate/private key in its local storage or in a specified area of a certificate store.

Improved methods and apparatus for provisioning a certificate to a user, for use by an application executable at a computer device, are provided to apply a digital signature to content authored using the application.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for provisioning a certificate, to a specific user of a computer device for use in applying a digital signature to electronically stored content, is described. The method includes receiving a request for a certificate, wherein the certificate is specific to a particular user of a computer device, and wherein the certificate is usable, by an application executable by a processor of a computer device, to apply a digital signature to electronically stored content. The method further includes embedding the requested certificate in a wrapper, the wrapper being formatted according to a file format compatible with the application and including at least one attribute facilitating enforcement of one or more digital rights management rule(s), and sending the wrapped certificate containing the embedded certificate to the computer device.

In another embodiment, an apparatus for provisioning a certificate to a user, for use in applying a digital signature to electronically stored content, is described. The apparatus includes a computer having a memory, a communication interface, one or more processors, and instructions stored in memory and executable by a processor of the one or more processors, the one or more processors being configured by execution of the instructions to process a request received via the communication interface, for a certificate unique to a specific user of a remote computer device, wherein the certificate is usable by an application executable by one or more processors of the remote computer device to apply a digital signature to electronically stored content. The one or more processors are further configured, by execution of the instructions, to embed the certificate in a wrapper, the wrapper being formatted according to a file format compatible with the application and including at least one attribute facilitating enforcement of one or more digital rights management rules, and to send the wrapper containing the embedded certificate to the remote computer device.

In yet another embodiment, a computer implemented method for provisioning a certificate for use in applying a digital signature to electronically stored content comprises transmitting a request for a certificate from a computer device, wherein the certificate is unique to a user of the computer device and is usable to apply a digital signature to electronically stored content; receiving the requested certificate embedded within a wrapper formatted according to a file format compatible with an application executable by a processor of the computer device and to include at least one attribute facilitating enforcement of a digital rights management rule upon execution of the application; extracting the certificate from the wrapper by execution of the application; and storing the extracted certificate in one of a local storage or certificate store in a memory of the computer device.

Figure 1:
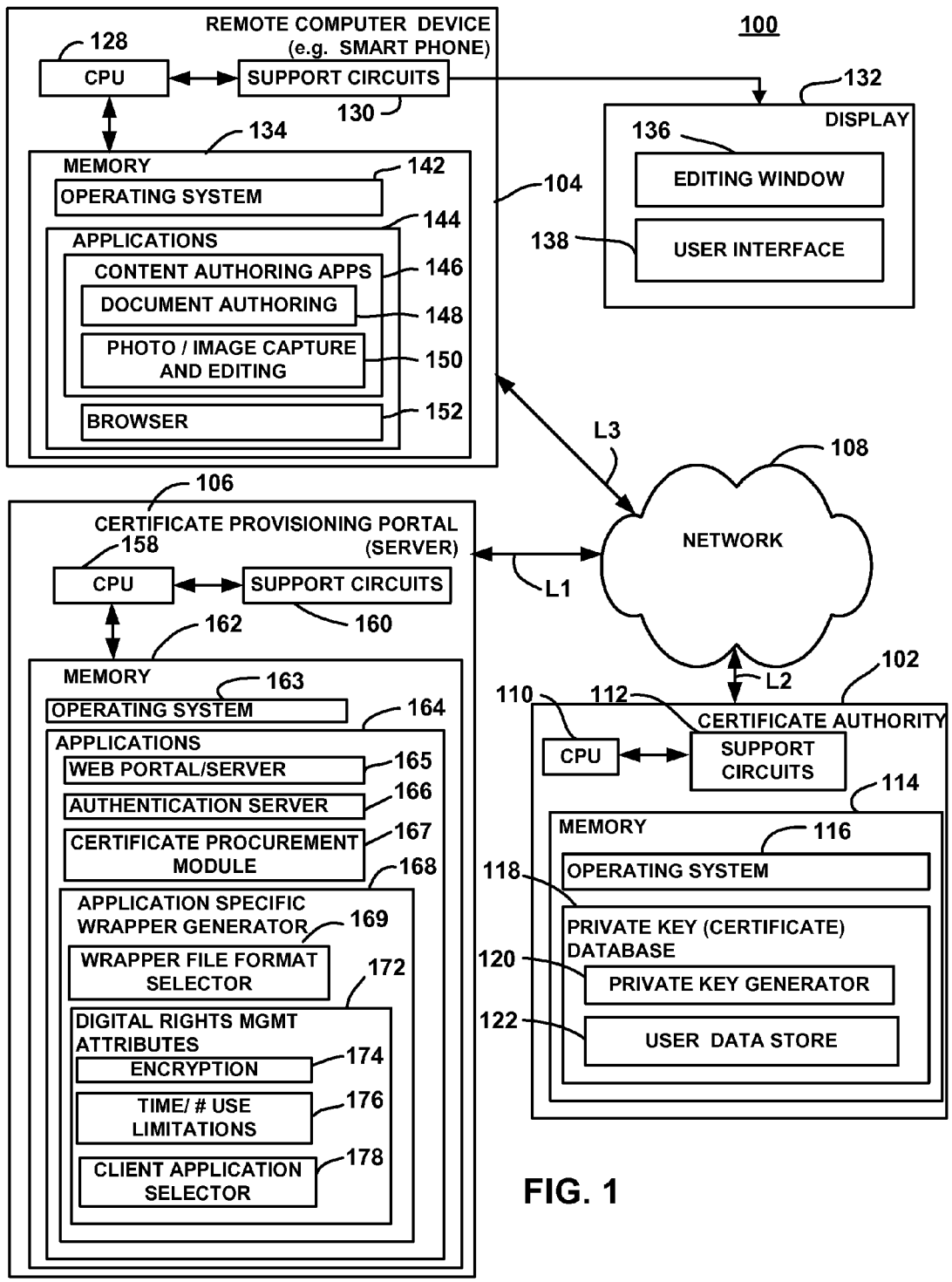
FIG. 1 is a block diagram of a system for provisioning certificates to users operating a computer device to request and/or apply a digital signature to electronically stored content, according to one or more embodiments.

While the method and apparatus is described herein by way of example for several embodiments and illustrative drawings, those skilled in the art will recognize that the method and apparatus for provisioning certificates to users operating a computer device to request and apply a digital signature to electronically stored content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for provisioning certificates to users operating a computer device to request and apply a digital signature to electronically stored content defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for provisioning certificates to users seeking to apply digital signatures to electronically stored content. Certificates are required to apply digital signatures to electronically stored content. A request for such a certificate is invoked by an application executing on a computer device. The request is received and processed at a server. Each certificate is a private key unique to a specific user. When an application executing on a device invokes a certificate request, the identity of the user operating the device is established by an authentication process. In some embodiments, if the authentication is successful, the server requests and obtains a certificate on behalf of the requesting user from a certificate issuing authority. Alternatively, the certificate may already be available in a trusted and secure store on or accessible to the server. According to some embodiments, the certificate is embedded in a wrapper formatted according to a file format accessible to an application executable on the computer device from which the user's request was originated. In an embodiment, the application is the same application as the one used by the computer device to create, modify and/or retrieve the electronically stored content. In other embodiments, a format accessible to a different executable application is employed. The wrapper includes at least one attribute that facilitates enforcement of one or more digital rights management rule(s). The at least one attribute can specify, for example, that the wrapper can be opened only once, that it can only be opened by a certain date, and/or that it can only be opened by a specific user or application. The wrapper containing the embedded certificate is then made available for download to the requesting device. Once downloaded to the requesting device, an application executing on the requesting device performs the extraction in compliance with any applicable digital rights management rule(s).

As used herein, "electronically stored content" means any document, spreadsheet, drawing, photo, image, audio recording, or video, or combination of these, embodied in an electronic format and accessible to one or more applications executable by the processor of a computer. A user operates a computer device such, for example as a smart phone, tablet computer, laptop or notebook computer, or other device configured to create, modify or retrieve the electronically stored content. By way of illustrative example, a user may create or modify an electronic document using a document creation and editing application such, for example, as, as Adobe® Acrobat® available from Adobe Systems Inc. of San Jose, Calif.

Certain computer devices are configured such that an application must have access to a certificate, in a private area of a certificate store devoted to that application, before it is able to apply a digital signature to any of the electronically stored content accessible to that application. This limitation applies to applications executable by the processor(s) of mobile devices such as smart phones and tablet computers because there is no common storage area providing access to all certificates stored by each of the applications. One possible solution would be to develop an application specifically configured, a priori, to sign electronic content. An application developer, for example, might collaborate with a smart card device manufacturer to arrange customized access to the certificate from a smart card device assigned to each user. Such an arrangement, however, would tie the application to a specific smart card supplier. Moreover, the application would only be configurable to handle a few, at best, electronic content file types and would thus not be scalable. Another solution would be to bundle the certificate(s) needed for applying digital signatures with the application itself. Here, the application would need to be bundled with and have access to a different certificate for each of the users of the computer device who may wish to apply a digital signature to electronically stored content. As such, this solution would neither be scalable nor dynamic.

Advantageously, embodiments disclosed and described herein enable an application to dynamically, scalably, and independently procure a digital certificate on behalf of each user of the same device. To make brute force attacks impractical, each wrapper containing an embedded certificate can be encrypted using a secure encryption algorithm. Moreover, digital rights management rules embodied in the wrapper can be configured to:

control which application(s) can extract and/or access the embedded certificate;

secure the certificate against man-in-the-middle attacks;

invalidate the wrapper containing the certificate so that a new wrapper must be requested if the certificate is not extracted within a configurable time; and revoke the wrapper after the first extraction operation or attempted access by an application.

Implementation according to embodiments is not tied to any digital certificate issuer or provider, or with any particular electronic content creation, editing or conversion application. It is compatible with various providers and with almost any application executable on a computer device including mobile computer devices. The application need only be able to parse a document in a format it is configured to access and process, and to extract the user's certificate from the parsed document for storage in a secure area of the computer device's memory.

Various embodiments of a method and apparatus for provisioning certificates to users operating a computer device to request and apply a digital signature to electronically stored content are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for provisioning certificates to users operating computer devices to request and apply a digital signature to electronically stored content, according to one or more embodiments. The system 100 includes a certificate provisioning portal or server 106, an exemplary computer device 104, and an exemplary certificate authority or server 102. The server 106 is a computing device, for example a desktop computer, laptop, tablet computer, and the like or the server 106 may be a cloud based server e.g., a blade server, virtual machine, and the like. The server 106 includes a Central Processing Unit (CPU) 158, support circuits 160, and a memory 162. The CPU 158 may include one or more commercially available microprocessors or microcontrollers that facilitate data processing and storage. The various support circuits 160 facilitate the operation of the CPU 158 and include one or more clock circuits, power supplies, cache, input/output circuits, and the like. The memory 162 includes at least one of Read Only Memory (ROM), Random Access Memory (RAM), disk drive storage, optical storage, removable storage and/or the like.

The memory 162 includes an operating system 163 which provides a platform for the execution of one or more applications by CPU 158. According to some embodiments, the applications include a web server or portal 165 configured to process requests for a certificate received from users of computer devices such as computer device 104. Also stored in memory 162 of server 106 is an authentication module 166. In a conventional manner, the authentication module 166 is configured to authenticate each user requesting a certificate. In some embodiments, authentication module confirms that the user of a requesting device is both eligible to obtain the certificate requested and to use at least one electronic content creation/editing application(s) supported by server 106. In such embodiments, the user may be asked to provide not only his or her identity and an access credential such as a password and/or device token, but also an identity of the application for which the certificate is being requested.

In some embodiments, requests are received at a web portal 165 from users who have navigated to a web page having a specified Uniform Resource Locator (URL) address. In embodiments, such navigation is performed using a web browser executing on the same computer device as the one being used to request the certification and execute the application that will apply a digital signature to electronically store content using the certificate. In an alternative embodiment, the request originates from a different device than the one which actually downloads and uses the certificate. During the authentication process, the user furnishes a set of user credentials which can include a user identifier, such as an e-mail address, and a password, with both of these being unique to a specific user.

With continuing reference to FIG. 1, the applications in memory 162 further include a certificate procurement module 167. In embodiments, certificate procurement module 167 is configured to request and obtain from certificate authority 102, on behalf of users authenticated by authentication module 166, a certificate in the form of a private key. Like server 106, the certificate authority server 102 is a computing device, for example a desktop computer, laptop, tablet computer, and the like or the server 102 may be a cloud based server e.g., a blade server, virtual machine, and the like. The server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like. In addition to an operating system 116, the memory 114 of certificate authority server 102 includes a private key (certificate) database generator 118 having a private key generator 120 and a user data store 122.

According to the embodiment of FIG. 1, the certificate procurement module 167 of server 106 originates and transmits a request to the certificate authority server 102 via communication links L1 and L2 to communication network 108. The request specifies the identity of the user on whose behalf the certificate is being requested. At server 102, a private key for use as a certificate is uniquely generated for the specified user using private key generator 120 and the key (certificate) is stored along with the user identifying date in user data store 122 of database 118.

The applications in memory 162 of server 106 further include an application specific wrapper generator 168. Application specific wrapper generator 168 includes a wrapper file format selector 169, and a digital rights management module or server 172. In some embodiments, the request originated by a user of device 104 specifies one of applications 164 to be executed, by a processor of device 104, to access electronically stored content and apply a digital signature to such content. In such cases, file format selector 169 identifies and selects a wrapper file format which is compatible with and accessible by the application specified in the request. In an embodiment, the application is specified by reference to an executable file, version number, serial number, and/or alternate or additional indicia by which the application can be identified and/or authenticated for purposes of selecting an appropriate wrapper file format. For example, if the application which is executable by device 104 and configured to apply a digital certificate using the requested certificate is Adobe® Acrobat®, then the ubiquitous "pdf" file format may be selected. In an alternate embodiment, the URL to which device 104 navigates is unique to a particular application and forms the basis of the wrapper file format selection made by file format selector 169.

It should be emphasized that there is no requirement that the file wrapper format itself be compatible with the application for which a digital certificate is being requested. Thus, in alternate embodiments, the request can specify an additional or alternative application which will serve any or all of the functions of requesting, receiving, and/or processing a "wrapped" certificate. Execution of a "support" application so configured, by the processor of the mobile terminal on which it is installed, can make the requested and acquired digital certificate available to one or more supported "target" applications on whose behalf the certificate is being request. For example, the support application may be configured to place the certificate in the appropriate local store area or certificate store within memory so that it is accessible to a target application selected by the user requesting a digital certificate.

According to embodiments, file format selector 169 is configured to embed the certificate obtained from server 102 within the wrapper file such that it is extractable by the specified application by a parsing operation the application is configured to perform. In some embodiments, digital rights management server 172 is implemented using a commercially available digital rights management service such, for example, as Adobe® LiveCycle® under license from Adobe Systems Inc. Attributes which may be optionally embodied in the wrapper file and enforceable by the application executing on computer device or by digital rights management server 172 include encryption 174, a finite limit on a number of file access operations permitted or a time limit by which the wrapper file containing an embedded certificate must be opened 176, and the identity of a specific application permitted to extract the certificate from the wrapper 178.

The user device 104 is a computing device, for example a desktop computer, laptop, tablet computer, smart phone, and the like that includes or is connected to a display 132. The user device 104 includes a Central Processing Unit (CPU) 128, support circuits 130, and a memory 134. The CPU 128 may include one or more commercially available microprocessors or microcontrollers that facilitate data processing and storage. The various support circuits 130 facilitate the operation of the CPU 128 and include one or more clock circuits, power supplies, cache, input/output circuits, and the like. The memory 134 includes at least one of Read Only Memory (ROM), Random Access Memory (RAM), disk drive storage, optical storage, removable storage and/or the like. The memory 134 includes an operating system 142 that provides a computing foundation for software modules or applications 144 of the user device 104.

The memory 134 includes one or more commercially available browsers 152 that allow the server 106 to receive requests for certificates from device 104, to provide requested authentication information, and to send a notification when the requested certificate is available for download. Other applications stored within memory 134 include electronic content authoring, editing and/or retrieval application(s) 146 including, for example, document creation module 148 and photo/image capture and/or editing software 150 such, for example, as Adobe® Photoshop Mobile. Display 132 is configured to display a browser window 136 and a user interface 138 associated with the content authoring, editing or retrieval applications 146. A link L3 to communication network 108 enables computer device 104 to communicate with server 106.

Figure 2:
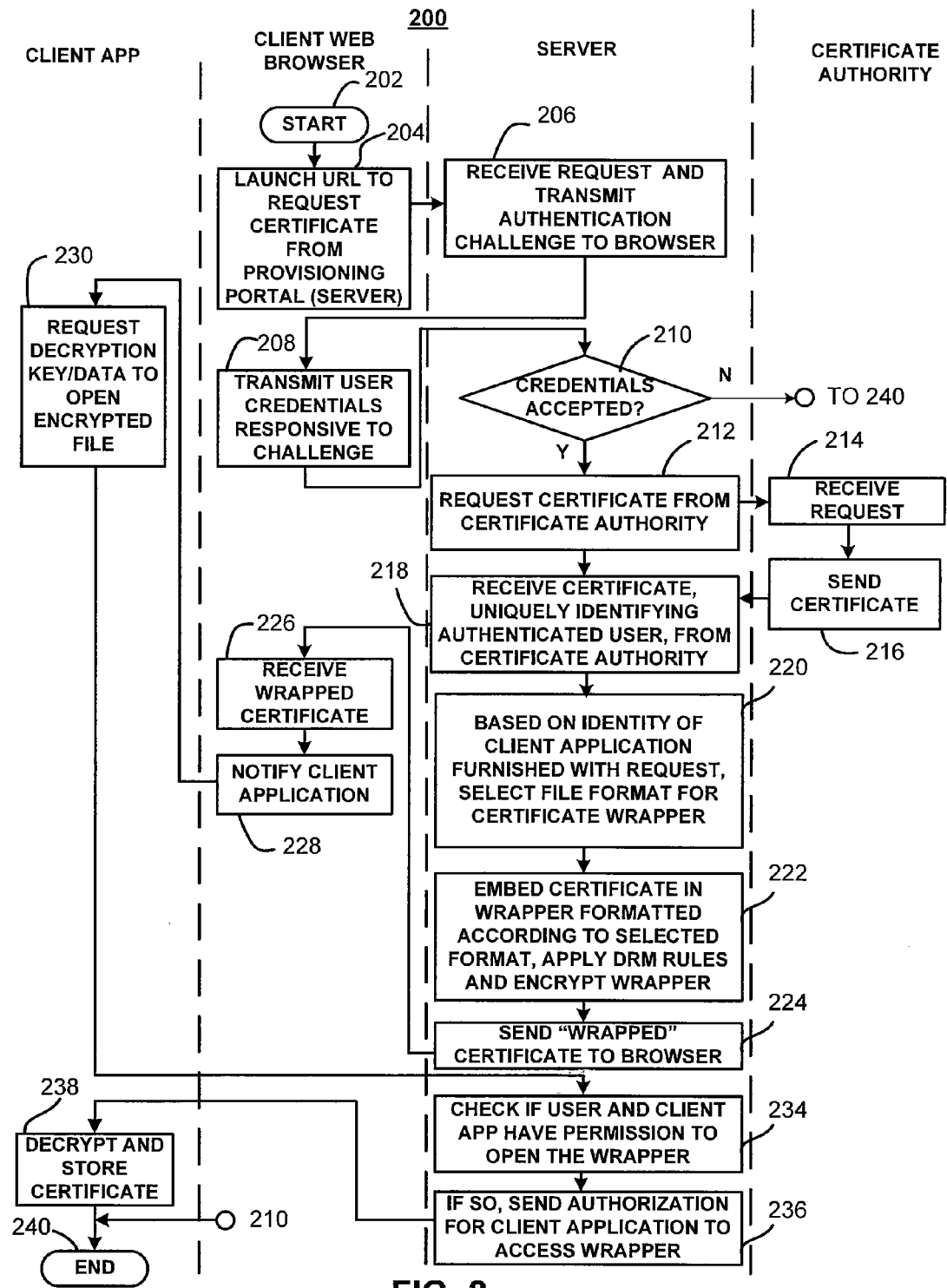
FIG. 2 depicts a flow diagram of a method for provisioning a certificate to a specific user operating a computer device to request and/or apply a digital signature to electronically stored content, according to one or more embodiments.

FIG. 2 depicts a flow diagram of a method 200 for provisioning a certificate to a specific user operating a computer device to request and/or apply a digital signature to electronically stored content, according to one or more embodiments. The method 200 starts at step 202 and proceeds to step 204.

At step 204, the method 200 launches a browser and navigates to a URL in order to request a certificate from a provisioning portal (server). The method proceeds to step 206, where the method 200 receives the request at a server and transmits an authentication challenge for display to the user via the browser. From step 206, the method 200 proceeds to step 208.

At step 208, user credentials are transmitted to the server responsive to the authentication challenge. The method 200 proceeds to step 210. If the transmitted credentials are not accepted at determination step 210, the method 200 proceeds to step 240 and terminates. However, if the credentials are accepted at 210, the method 200 proceeds to step 212. In some embodiments, a certificate may already be locally available at the server or from a facility affiliated with the server. According to other embodiments, a certificate unique to a user of a requesting device is requested from a third party certificate authority. Thus, at step 212, the method 200 requests a certificate from a certificate authority by providing the identifying data about the user such as the user's name, address, telephone number, email address and other information specific to the particular user. At step 214, the method 200 receives, at step 214, the request at the certificate authority and at step 216 the method 200 responds to the request by generating at and sending a certificate from the certificate authority. The certificate sent is unique to the specific user on whose behalf the certificate was requested. The method 200 proceeds to step 218, where the method 200 receives, at the server, a certificate from the certificate authority.

From step 218, the method proceeds to step 220. At step 220, the method 200 selects a file format for a wrapper based on the identity of a client application furnished with the request. The method generates the wrapper according to the selected format at step 222, and embeds the certificate in a wrapper. The wrapper so generated contains at least one attribute which facilitates enforcement of one or more digital rights management rules. Optionally, the method encrypts the wrapper using a secure algorithm. The method then proceeds to step 224.

At step 224, the method 200 sends the "wrapped" certificate" to the device which invoked the browser to request a certificate for use in applying digital signatures to electronically stored content. The method 200 then proceeds to step 226, where the method receives a notification, via the browser, of the wrapped certificate being available for download. In alternate embodiments, the wrapped certificate is transmitted to the device and processed by the browser. At step 228, the method 200 notifies the client application, identified as being the one to be used for processing of the wrapper, that the wrapper has been received. From step 228, the method 200 proceeds to step 230. At step 230, if the wrapper was encrypted at step 222, then the method 200 requests a decryption key to open the encrypted file and, at step 234, the method 200 optionally performs an authentication process. During such an authentication process, credentials such as a name, password, and/or token may be requested of, and sent from the device. By submission of the credentials, the user establishes that the device he or she is operating is entitled to receive the decryption key and/or to execute a specified application for the purpose of retrieving and applying a digital signature using the certificate extracted after using the decryption key. In the absence of the authentication process, any digital rights management rules applicable to the wrapper are enforced, by the application configured to extract the certificate, by reference to any digital rights management (DRM) attributes embodied in the wrapper.

If access to the certificate by the application executing on the device used by the user is appropriate under the applicable DRM rules then, in accordance with an embodiment, the method at step 236 authorizes the user and client application to access the wrapper and extract the embedded certificate. The method then proceeds to step 238. At step 238, the client application decrypts the document, extracts the certificate, and stores in a memory of the device executing the client application. From step 238, the method proceeds to step 240 and terminates.

Figure 3:
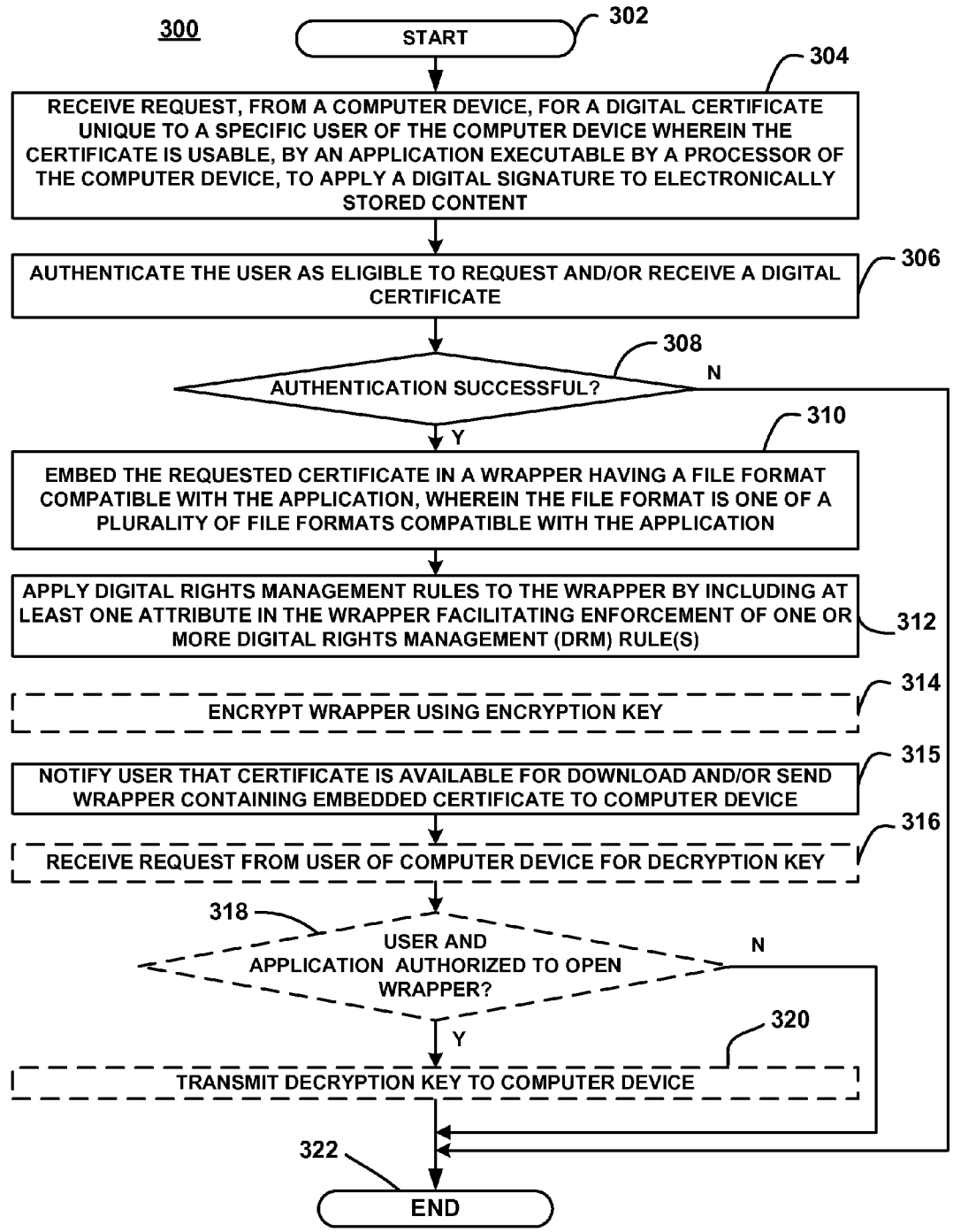
FIG. 3 depicts a flow diagram of server side details of a method for provisioning a certificate to a specific user operating a computer device to request and/or apply a digital signature to electronically stored content as performed by the certificate provisioning portal of FIG. 1, according to one or more embodiments.

FIG. 3 depicts a flow diagram of server side details of a method 300 for provisioning a certificate to a specific user operating a computer device. The method requests and/or applies a digital signature to electronically stored content, according to one or more embodiments. The method 300 is entered at step 302 and proceeds to step 304. At step 304, the method receives a request, from a computer device, for a certificate unique to a specific user of the computer device. The certificate requested is usable, by an application executable by a processor of the computer device, to apply a digital signature to electronically stored content. The method 300 then proceeds to step 306.

At step 306, the method authenticates the user as being eligible to request and/or receive a digital certificate for use in applying signatures to electronic content using an application executable by the computer device. The method proceeds to step 308.

At step 308, the method determines whether the authentication was successful. If not, the method proceeds to step 322 and terminates. If so, the method proceeds to step 310. At step 310 the method embeds the requested certificate in a wrapper having a file format compatible with the application, wherein the file format is one of a plurality of file formats compatible with the application. From step 310, the method proceeds to step 312.

At step 312, the method applies one or more digital rights management rules to the wrapper by including in the wrapper at least one attribute facilitating enforcement of the one or more digital rights management rules by at least one of the application or a digital rights management server. By way of illustrative example, an attribute of the wrapper may specify a configurable time or date by which the user must use the application to access the wrapper and extract the certificate embedded in the wrapper. Alternatively, or in addition, an attribute of the wrapper may specify a particular application which must be used to access the wrapper and access the embedded certificate.

In some embodiments, the method 300 proceeds from step 312 to step 314. At step 314, an optional step of encrypting the wrapper containing the embedded certificate is performed using a conventional but secure encryption algorithm. Whether or not encrypted, at step 315 the method sends (e.g., downloads or transmits) the wrapper containing the embedded certificate to the device used by the user to submit the request. If the wrapper was encrypted, then at step 316 the method receives a request for the encryption key. The method 300 proceeds to step 318.

At step 318, the method 300 determines whether the user and application are authorized to open the wrapper according to any applicable DRM rule(s) enforceable by the application and/or a DRM server. If not the method 300 proceeds to step 322 and terminates. However, if the authentication is successful, then the method 300 grants such authorization at step 320 and sends the decryption key if applicable.

Figure 4:
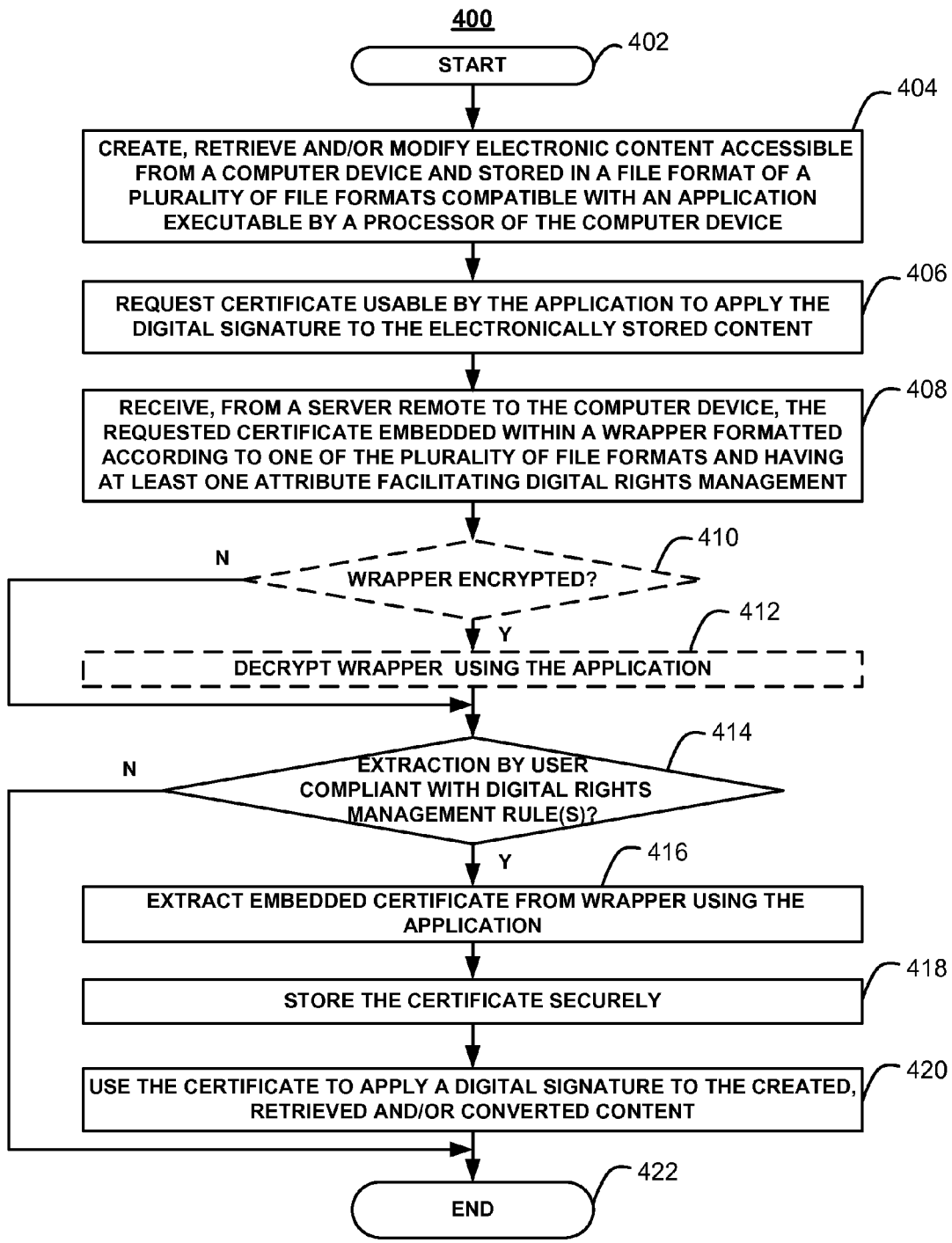
FIG. 4 depicts a flow diagram of client side details of a method for operating a computer device to request, obtain, extract and apply a certificate for use in applying a digital signature to electronically stored content according to one or more embodiments.

FIG. 4 depicts a flow diagram of client side details of a method 400 for operating a computer device to request, obtain, extract and apply a certificate for use in applying a digital signature to electronically stored content according to one or more embodiments. The method 400 is entered at step 402 and proceeds to step 404. At step 404, the method 400 creates and/or modifies electronic content accessible from a computer device and stored in a memory of the device according to a file format of a plurality of file formats compatible with an application executable by a processor of the computer device. The method 400 proceeds to step 406.

At step 406, the method 400 requests a certificate usable by the application to apply the digital signature to the electronically stored content and proceeds to step 408. At step 408, the method receives, from a server remote to the computer device, the requested certificate embedded within a wrapper formatted according to one of the plurality of file formats. The wrapper is formatted to include at least one attribute facilitating enforcement of one or more digital rights management rule(s). The method 400 proceeds to step 410.

At optional step 410, the method 400 determines whether or not the wrapper received from the server is encrypted. If so, the method proceeds to optional step 412, where the wrapper is decrypted using the application and a key provided by the server. If no encryption was applied, or following decryption of the wrapper by the application, the method determines at step 414 whether or not extraction—by the user operating the computer device to execute the application—is compliant with any applicable DRM rules, If not, the method proceeds to step 422 and terminates. Otherwise, the method proceeds to step 416 and extracts the embedded certificate from the wrapper using the application executing on the computer device. The method then advances to step 418, where the method stores the certificate securely in a memory of the computer device. At step 422, the method 400 thereafter executes the application, which uses the certificate to apply a digital signature to created, modified and/or retrieved electronically stored content. The method 400 terminates at step 422.

Figure 5:
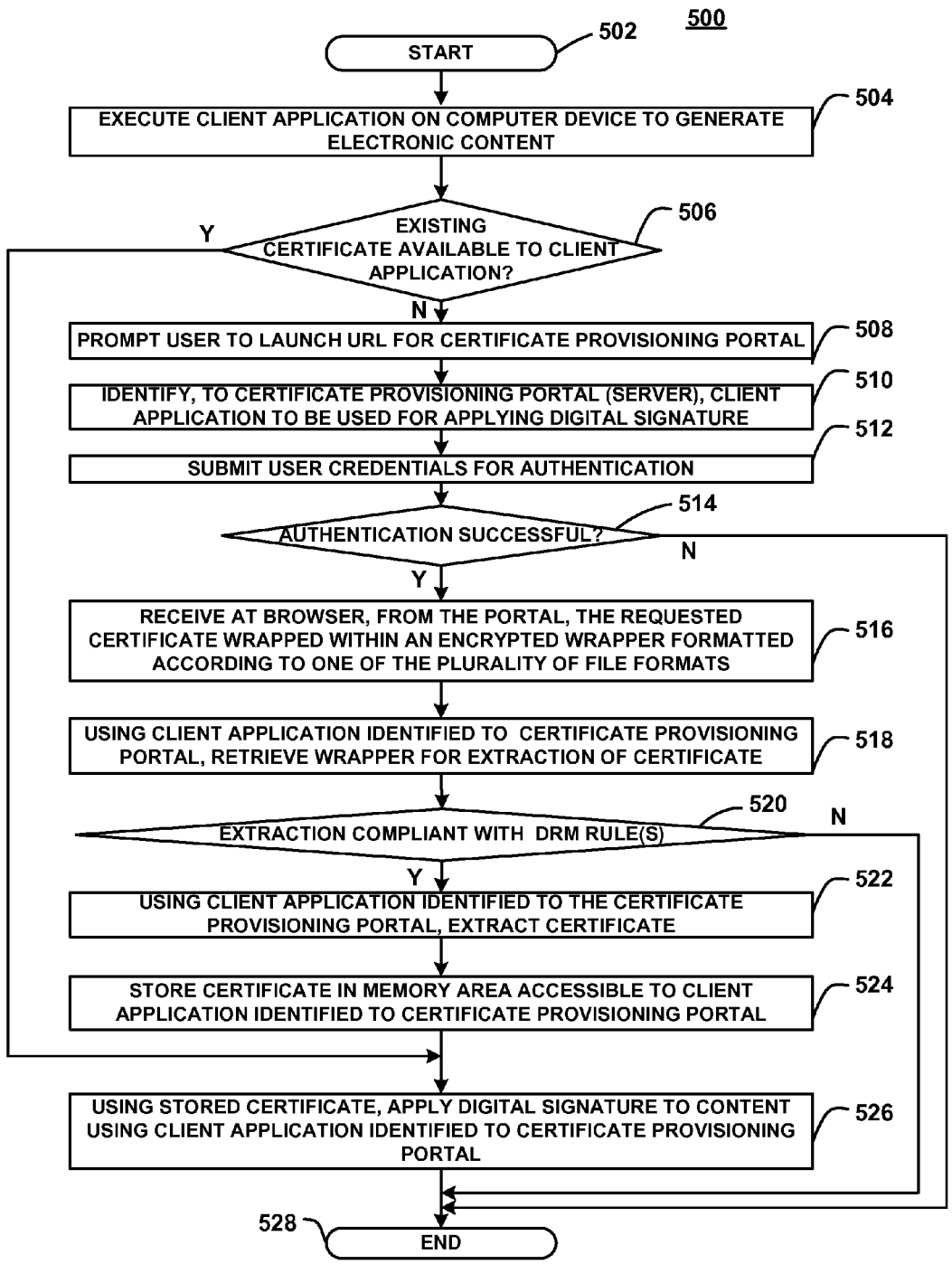
FIG. 5 depicts a flow diagram of further details of a method for operating a computer device to request, obtain, extract and apply a certificate for use by a user operating the computer device to apply a digital signature to electronically stored content, according to one or more embodiments.

FIG. 5 depicts a flow diagram of further details of a method 500 for operating a computer device to request, obtain, extract and apply a certificate for use by a user operating the computer device to apply a digital signature to electronically stored content, according to one or more embodiments. The method 500 is entered at step 502 and proceeds to step 504.

At step 504, the method 500 executes a client application on a computer device to generate content stored electronically in a file format accessible to and manipulable by the client application. The method 500 proceeds to step 506. At step 506, the method determines whether an existing certificate is available to the client application. If so, the method 500 proceeds to step 526 where the method uses an application identified to a certificate provisioning portal to fetch and use the stored certificate to apply content. Otherwise the method 500 proceeds to step 508.

At step 508, the method 500 prompts the user to launch a URL from a browser in order to request provisioning of a certificate from a certificate provisioning portal. From step 508, the method 500 proceeds to step 510, where the method identifies, to the certificate provisioning portal (server), a client application to be used for applying a digital signature to electronically stored content. The method 500 proceeds to step 512.

At step 512, the method submits an identity such, for example, as a user name or e-mail address, and a credential such, for example, as a password or device token, for authentication by a server. At step 514, the method 500 determines whether or not the authentication was successful. If not, the method 500 proceeds to step 528 and terminates. Otherwise, the method 500 proceeds to step 516.

At step 516, the method 500 receives, from the certificate provisioning portal, the requested certificate wrapped within an, optionally, encrypted wrapper formatted according to a file format selected from a plurality of formats associated and compatible with the identified application. From step 516 the method 500 proceeds to step 518. At step 518, the method uses the client application identified to the certificate provisioning portal to retrieve the wrapper. At step 520, a determination is made as to whether extraction of the certificate embedded in the wrapper would be compliant with DRM rules. If not, the method 500 proceeds to step 528 and terminates. Otherwise, the method 500 proceeds to step 522, where the method uses the client application identified to the certificate provisioning portal to extract the certificate. At step 524, the method 500 stores the extracted certificate in a memory area accessible to the client application and proceeds to step 526, where the method uses the stored certificate to apply a digital signature to electronically stored content. From step 526, the method 500 proceeds to step 528 and terminates.

Figure 6A:
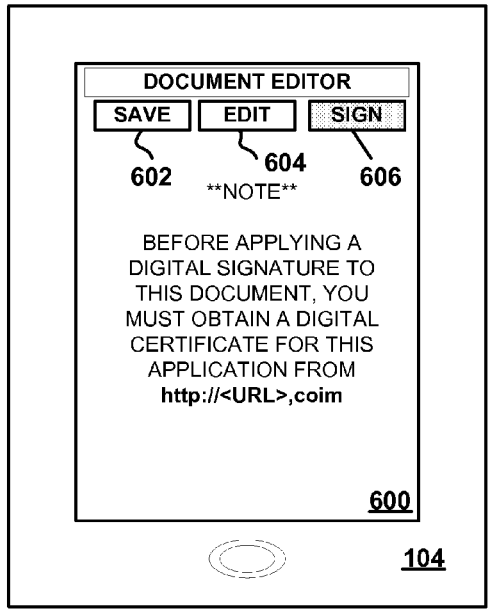
FIGS. 6A-6D collectively depict a user interface reflecting interactions between a certificate provisioning portal and a computer device requesting a provisioned certificate, according to one or more embodiments.
Figure 6B:
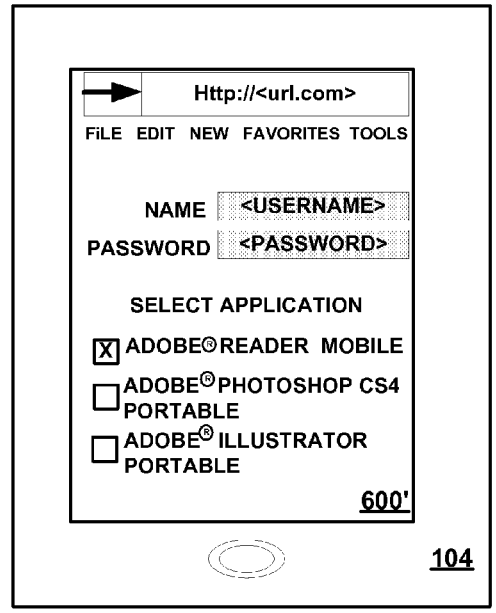
Figure 6C:
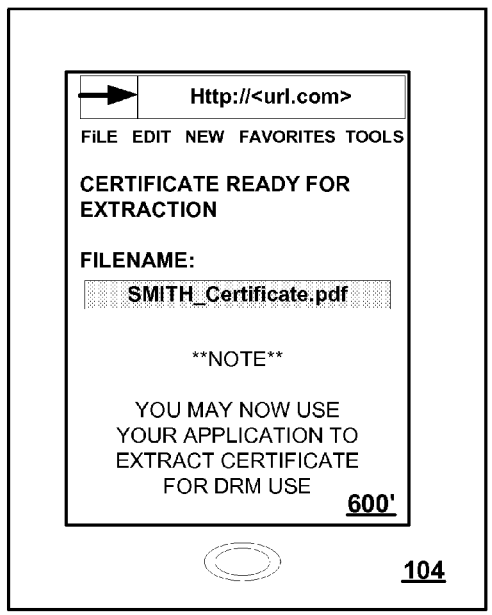
Figure 6D:
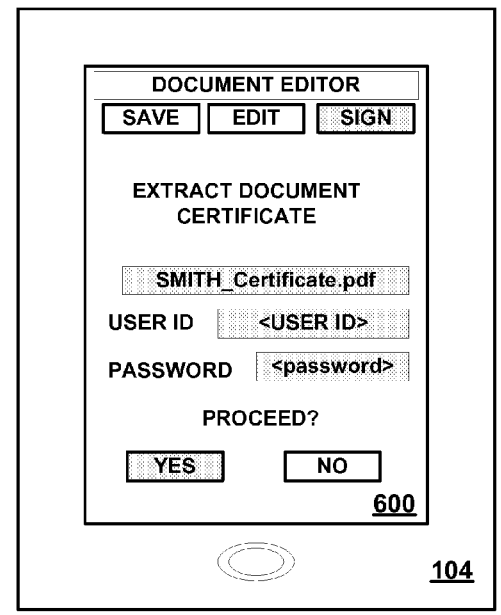

FIGS. 6A-6D depict a user interface reflecting interactions between a certificate provisioning portal and a computer device requesting a provisioned certificate, according to one or more embodiments. FIGS. 6A and 6D depict the user of device 104 invoking a user interface 600 of a document editing application executable by a processor 128 (FIG. 1) of device 104 to generate, modify, or retrieve electronically stored content. Soft buttons 602, 604 and 606 correspond to functions for saving a document, editing a document signing a document, respectively. FIG. 6A provides the user with the URL address of a certificate provisioning portal for requesting and obtaining a certificate for use in generating a digital certificate usable by the document editing application displayed, while FIG. 6D identify authentication information to be provided by the user in order to extract the certificate once it has been received/downloaded from the provisioning portal.

FIGS. 6B and 6C depict the user interface 600' of a web browser client executable by the processor of device 104 to invoke a certificate request. As seen in FIG. 6B, a user using a browser to navigate to the URL address depicted in FIG. 6A is prompted to provide an identity (e.g., a user name or email address), authentication credentials (e.g., a password), and an identity of the application for which the user requires a certificate for use in applying digital signatures. FIG. 6C depicts an exemplary message displayed to the user of device 104 via interface 600' when a certificate embedded in a wrapper is available for download according to embodiments illustrated and described herein.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   receiving a request for a certificate,
      wherein the certificate is unique to a user of a computer device, and
      wherein the certificate is usable to apply a digital signature to electronically stored content;
   identifying an application for which the request was received;
   determining a file format associated with the application for which the request was received;
   embedding the certificate in a wrapper file, the wrapper file including at least one attribute facilitating enforcement of a digital rights management rule;
   formatting the wrapper file according to the determined file format with a file extension compatible with and accessible by the application;
   sending the wrapper file containing the embedded certificate to the computer device; and authenticating the user prior to sending the embedded certificate to the computing device.

2. The method according to claim 1, wherein formatting the wrapper file according to the determined file format with a file extension compatible with and accessible used by the application comprises formatting the wrapper file with a PDF file extension.

3. The method according to claim 1, wherein receiving the request includes receiving, at a server, a request that specifies at least one of an identity of the user or an identity of the application.

4. The method according to claim 3, wherein the application specified in the request is an application used by the user to generate or retrieve electronically stored content.

5. The method according to claim 4, wherein the specified application allows the user to retrieve or generate, at the computer device, electronically stored content.

6. The method according to claim 3, wherein authenticating the user comprises authenticating credentials provided by the user.

7. The method of claim 6, further including requesting a certificate from a certificate authority upon successful authentication of the user with the server.

8. The method of claim 1, further including encrypting the wrapper file containing the embedded certificate prior to sending.

9. The method of claim 1, wherein the at least one attribute specifies at least one of a number of times the wrapper file can be opened by the application and a date by which the wrapper file can be opened by the application.

10. An apparatus for provisioning a certificate for use in applying a digital signature to electronically stored content, comprising:
    a computer having a non-transitory memory, a communication interface, one or more processors, and instructions stored in the non-transitory memory and executable by a processor of the one or more processors to cause the apparatus to:
       process a request, received via the communication interface, for a certificate unique to a specific user of a remote computer device, wherein the certificate is usable to apply a digital signature to electronically stored content;
       identify an application for which the request was received;
       determine a file format associated with the application for which the request was received;
       embed the certificate in a wrapper file, the wrapper file including at least one attribute facilitating enforcement of a digital rights management rule;
       format the wrapper file according to the determined file format with a file extension compatible with and accessible by the application;
       send the wrapper file containing the embedded certificate to the remote computer device; and
       authenticate the user prior to sending the embedded certificate to the computing device.

11. The apparatus according to claim 10, wherein the instructions, when executed by the processor, cause the apparatus to format the wrapper file with a PDF file extension.

12. The apparatus according to claim 10, wherein the specified application allows the user to retrieve or generate electronically stored content.

13. The apparatus according to claim 10, wherein the instructions, when executed by the processor, cause the apparatus to:
    receive the request for a certificate at a server, the request specifying an identity of the user and one or more credentials; and
    authenticate the user with the server by authenticating the one or more credentials.

14. The apparatus to claim 13, wherein the instructions, when executed by the processor, cause the apparatus to request a certificate from a certificate authority upon successful authentication of the user with the server.

15. The apparatus according to claim 13, wherein the instructions, when executed by the processor, cause the apparatus to encrypt the wrapper file prior to sending.

16. A computer implemented method for provisioning a certificate for use in applying a digital signature to electronically stored content comprising:
    transmitting a request for a certificate from a computer device, wherein the certificate is unique to a user of the computer device and is usable to apply a digital signature to electronically stored content;
    receiving the requested certificate embedded within a wrapper file formatted according to a file format with a file extension compatible with and accessible by an application executable by a processor of the digital computer device and to include at least on attribute facilitating enforcement of a digital rights management rule upon execution of the application, wherein the user is authenticated prior to receiving the requested certificate embedded within the wrapper file;

extracting the certificate from the wrapper file by execution of the application; and storing the extracted certificate in one of a local storage or certificate store in a memory of the computer device.

17. The method according to claim 16, wherein transmitting the request includes specifying an application with which a requested certificate is to be used.

18. The computer readable medium according to claim 17, wherein the specified application is a same application as the application performing the extracting.

19. The method according to claim 16, wherein the at least one attribute specifies a number of times the wrapper file can be opened by the application.

20. The method according to claim 16, wherein the at least one attribute specifies a date by which the wrapper file can be opened by the application for the extraction of the embedded certificate.

* * * * *